US009515322B2

(12) United States Patent
Niimi et al.

(10) Patent No.: US 9,515,322 B2
(45) Date of Patent: Dec. 6, 2016

(54) SOLID OXIDE FUEL CELL

(71) Applicant: TOTO LTD., Kitakyushu-Shi, Fukuoka (JP)

(72) Inventors: Hiroshi Niimi, Kanagawa-Ken (JP); Akira Ishiguro, Kanagawa-Ken (JP); Shigeru Ando, Kanagawa-Ken (JP); Akira Kawakami, Kanagawa-Ken (JP); Megumi Shimazu, Kanagawa-Ken (JP); Yuya Takahashi, Kanagawa-Ken (JP)

(73) Assignee: Toto Ltd., Fukuoka (JP)

( * ) Notice: Subject to any disclaimer, the term of this patent is extended or adjusted under 35 U.S.C. 154(b) by 232 days.

(21) Appl. No.: 14/100,101

(22) Filed: Dec. 9, 2013

(65) Prior Publication Data

US 2014/0162149 A1 Jun. 12, 2014

(30) Foreign Application Priority Data

Dec. 10, 2012 (JP) ................. 2012-269223

(51) Int. Cl.
| | | |
|---|---|---|
| H01M 4/88 | (2006.01) | |
| H01M 4/86 | (2006.01) | |
| H01M 8/12 | (2016.01) | |
| H01M 4/90 | (2006.01) | |

(52) U.S. Cl.
CPC ......... *H01M 4/8885* (2013.01); *H01M 4/8621* (2013.01); *H01M 4/8652* (2013.01); *H01M 4/8889* (2013.01); *H01M 4/9033* (2013.01); *H01M 8/1213* (2013.01); H01M 4/8828 (2013.01); H01M 8/1253 (2013.01); H01M 2008/1293 (2013.01); Y02E 60/521 (2013.01); Y02E 60/525 (2013.01); Y02P 70/56 (2015.11)

(58) Field of Classification Search
CPC ........... H01M 4/8621; H01M 4/8652; H01M 4/8885; H01M 4/8889; H01M 4/9033; H01M 8/1213; H01M 8/1253
See application file for complete search history.

(56) References Cited

U.S. PATENT DOCUMENTS

| 2010/0098999 | A1* | 4/2010 | Niimi | H01M 8/0232 |
| | | | | 429/442 |
| 2013/0295483 | A1* | 11/2013 | Monden | H01M 4/88 |
| | | | | 429/481 |

FOREIGN PATENT DOCUMENTS

JP    WO 2012096023 A1 * 7/2012 .............. H01M 4/88

OTHER PUBLICATIONS

C.A. Hancock, R.C.T. Slade, J.R. Varcoe, P.R. Slater, "Synthesis, structure and conductivity of sulfate and phosphate doped SrCoO3", Sep. 14, 2011, Journal of Solid State Chemistry 184 (2011) 2972-2977.*
Jing Xie, Young-Wan Ju, Tatsumi Ishihara, "Influence of sulfur impurities on the stability of La0.6Sr0.4Co0.2Fe0.8O3 cathode for solid oxide fuel cells", Sep. 13, 2013, Solid State Ionics 249-250, pp. 177-183.*
J. Andreas Schuler, Harumi Yokokawa, Caroline F. Calderone, Quentin Jeangros, Zacharie Wuillemin, Aicha Hessler-Wyser, Jan Van herle, "Combined Cr and S poisoning in solid oxide fuel cell cathodes", Nov. 9, 2011, Journal of Power Sources 201, pp. 112-120.*

* cited by examiner

Primary Examiner — Jonathan Jelsma
(74) Attorney, Agent, or Firm — Carrier Blackman & Associates, P.C.; Joseph P. Carrier; William D. Blackman

(57) ABSTRACT

Disclosed is a durable solid oxide fuel cell that is less likely to have a problem of a conventional solid oxide fuel cell that an air electrode containing a peroviskite oxide, when exposed to a reducing atmosphere, is separated at the stop of operation, especially shutdown. The solid oxide fuel cell includes an air electrode that is obtained by firing a compact containing a perovskite oxide and sulfur element. The content of the sulfur element in the air electrode as fresh after firing or before the start of power generation is in the range of 50 ppm to 3,000 ppm. The separation of the air electrode is effectively suppressed at the shutdown operation.

9 Claims, 6 Drawing Sheets

SOLID OXIDE FUEL CELL

FIELD OF INVENTION

The present invention relates to a solid oxide fuel cell that prevents the separation of an air electrode at the stop of operation, especially at shutdown, and a fuel cell system including the solid oxide fuel cell.

BACKGROUND ART

Solid oxide fuel cells (SOFCs) including a solid oxide as a solid electrolyte are one kind of fuel cells.

Solid oxide fuel cells including lanthanum strontium cobaltite ferrite (LSCF) as an air electrode are also known (for example, JP 2001-196083A (PTL 1). There is a report that LSCF in the air electrode is poisoned by S (sulfur) in SOx contained in air in contact with the air electrode, particularly $SO_2$ (Wang et al., J. Electrochem. Soc., 158, B1391 (2011) (NPL 1)). This literature reports that, in solid oxide fuel cells including an air electrode made of LSCF as an air electrode, sulfur is reacted with Sr (strontium) in LSCF to form $SrSO_4$ on the surface of LSCF, disadvantageously leading to lowered power generation performance. As far as the present inventors know, there is no report that approvingly interprets the presence of sulfur in the air electrode before the use of the solid oxide fuel cell.

CITATION LIST

Patent Literature

[PTL 1] JP 2001-196083A

Non Patent Literature

[NPL 1] Wang et al., J. Electrochem. Soc., 158, B1391 (2011)

SUMMARY OF THE INVENTION

The present inventors have observed, through their experiments, separation of an air electrode including a perovskite oxide at the stop of operation, especially at shutdown. This separation lowers the durability of the solid oxide fuel cell and, in some cases, leads to loss of a power generation function of the cell. The present inventors have now found that the separation can be suppressed by incorporating a specific amount of sulfur in the air electrode.

Accordingly, an object of the present invention is to provide a durable solid oxide fuel cell by suppressing the separation of the air electrode.

Another object of the present invention is to provide a method for manufacturing a solid oxide fuel cell according to the present invention and a fuel cell system including the fuel cell.

According to one aspect of the present invention, there is provided a solid oxide fuel cell comprising a solid electrolyte, a fuel electrode, and an air electrode, wherein the air electrode comprises a product obtained by firing a compact containing a perovskite oxide and sulfur element, and the content of sulfur in the air electrode which is as fresh after firing or before the start of power generation is 50 ppm to 3,000 ppm.

According to another aspect of the present invention, there is provided a fuel cell system comprising the above solid oxide fuel cell.

According to still another aspect of the present invention, there is provided a method for manufacturing a solid oxide fuel cell, the method comprising: providing a starting material powder including a perovskite oxide with a sulfur compound added thereto; dispersing the starting material powder in a solvent to prepare a slurry; and applying the slurry to a solid electrolyte or its precursor, drying the coated solid electrolyte or its precursor, and firing the dried solid electrolyte or its precursor to prepare an air electrode.

According to a further aspect of the present invention, there is provided a method for manufacturing a solid oxide fuel cell, the method comprising: firing a mixture obtained by adding a sulfur compound to a starting material employed in preparing a perovskite oxide to obtain a sulfur element-containing perovskite oxide; comminuting the perovskite oxide to obtain a starting material powder; dispersing the starting material powder in a solvent to prepare a slurry; and applying the slurry to a solid electrolyte or its precursor, drying the coated solid electrolyte or its precursor, and firing the dried solid electrolyte or its precursor to prepare an air electrode.

EMBODIMENTS FOR CARRYING OUT THE INVENTION

Definition

Figure 1:
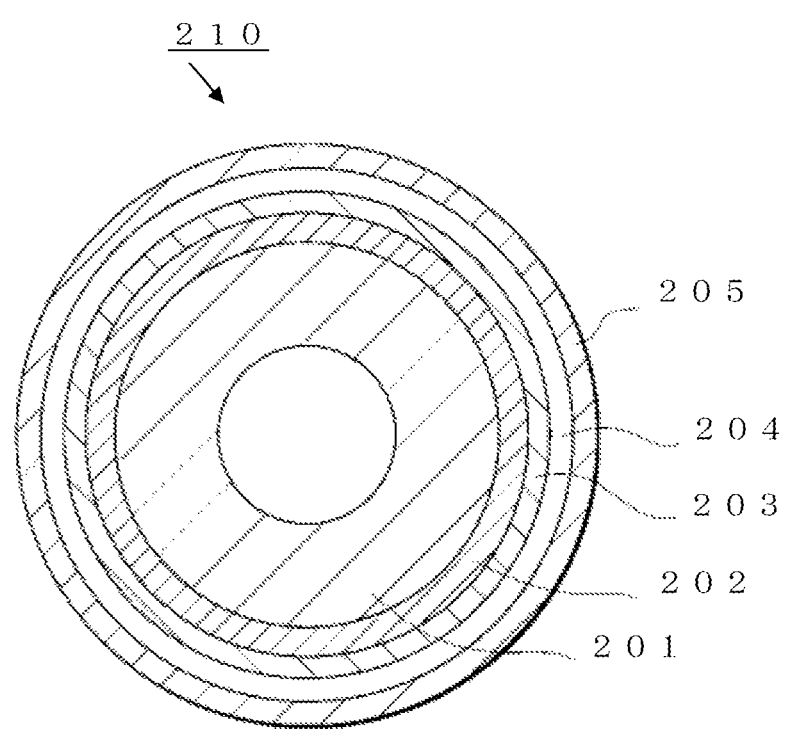
FIG. 1 is a typical view showing one embodiment of a cross section of a solid oxide fuel cell according to the present invention.

The fuel cell according to the present invention is the same as a fuel cell that includes at least a fuel electrode, a solid electrolyte, and an air electrode and is usually classified or understood as a solid oxide fuel cell in the art, except that the air electrode satisfies requirements that will be described below. Furthermore, the fuel cell according to the present invention can be used in systems that are understood or will be understood in the future as fuel cell systems in the art. The fuel cell according to the present invention may have any shape without limitation and may be in the form of cylinders, plates, and hollow plates with a plurality of gas flow paths formed in the inside thereof. Further, an inner electrode may be formed on the surface of a support.

The expression of the timing of "before the start of power generation" in the present invention means a timing before a commercial operation after firing of fuel cells. Even if the operation is conducted after trial operation, pre-shipment operation or the like, the timing is also considered to be "before the start of power generation" when they are conducted before the commercial operation.

In the present invention, the expression "stop of operation" includes ordinary stopping and shutdown. The ordinary stopping is usually systematically carried out to minimize an adverse effect on the fuel cell. In the shutdown, the operation should be stopped immediately after system malfunction, and, in this case, the supply of fuel and air is immediately stopped.

Air Electrode

In the present invention, the air electrode comprises a product obtained by firing a compact containing a perovskite oxide and sulfur element, and the content of sulfur element in the air electrode which is as fresh after firing or before the start of power generation is 50 ppm to 3,000 ppm. The lower limit of the content of sulfur element is preferably 100 ppm, more preferably 200 ppm. The upper limit of the content of sulfur element is preferably 3000 ppm. The content of sulfur element in the above-defined range can effectively prevent the separation of the air electrode at the stop of operation, especially at shutdown while maintaining a high level of power generation performance. Although the reason why the content of sulfur element above can effectively prevent the separation of the air electrode at the stop of operation, especially at shutdown has not been clearly elucidated yet the reason is considered as follows. The air electrode in the solid oxide fuel cell according to the present invention is obtained by firing a sulfur element-containing compact. Accordingly, the existence form of the sulfur element contained in the air electrode according to the present invention is considered to be different from at least the existence form of sulfur incorporated from air. Furthermore, according to finding of the present inventors, the exposure of the air electrode to a reducing atmosphere during the stop of operation is considered to be causative of the separation of the air electrode. Specifically, during operation, fuel gas is supplied to the fuel electrode, and air is supplied to the air electrode. Thus, the fuel electrode is exposed to a reducing atmosphere, and the air electrode is exposed to an oxidizing atmosphere. On the other hand, during the stop of operation, when the supply of the fuel gas or air is stopped, in some cases, the fuel gas that stays in the fuel pipe, the reformer, and the fuel manifold is jetted into the air electrode from the cell opening that is an outlet of the fuel gas flow path, whereby the air electrode is exposed to a reducing atmosphere. There is a possibility that the reducing atmosphere induces the separation of the air electrode.

In the present invention, the air electrode comprises a product obtained by firing a compact containing a perovskite oxide and sulfur element. As far as the sulfur element is present in the compact before firing, the sulfur element can be one derived from a sulfur compound that has been mixed independently with the perovskite oxide, or one derived from a sulfur compound contained in a starting material employed in preparing the perovskite oxide.

In the present invention, examples of perovskite oxide constituting the air electrode include lanthanum cobalt-based oxides such as $La_{1-x}Sr_xCoO_3$ where x=0.1 to 0.3 and $LaCo_{1-x}Ni_xO_3$ where x=0.1 to 0.6, lanthanum cobalt ferrite-based oxides that are (La, Sr)FeO_3-based and (La, Sr)CoO_3-based solid solutions $(La_{1-m}Sr_mCo_{1-n}Fe_nO_3$ where 0.05<m<0.50 and 0 n 1), and samarium cobalt-based oxides containing samarium and cobalt $(Sm_{0.5}Sr_{0.5}CoO_3)$. Lanthanum strontium cobaltite ferrite (LSCF) is preferred.

In the present invention, the sulfur compound may be either organic sulfur compounds or inorganic sulfur compounds. Specific examples of organic sulfur compounds include compounds known as surfactants such as naphthalene sulfonic acid formalin, dodecylbezene sulfonic acid, sodium dodecylbezene sulfonate, sodium alkyl naphthalene sulfonate, sodium dialkyl sulfosuccinate, sodium alkyl diphenyl ether disulfonate, sodium alkane sulfonate, ammonium polyoxyalkyhlene alkenyl ether sulfonate, β-napthalene sulfonic acid formalin, sodium lauryl sulfonate, sodium alcohol sulfonate, lauryl sulfonic acid triethanol amine, sodium polyoxyethylene alkyl ether sulfate, sodium polyoxyethylene lauryl ether sulfate, and polyoxyethylene alkyl ether sulfuric acid triethanol amine; dimethyl sulfide; and allyl sulfide. Amino acids such as cysteine, methionine, homosysteine, and taurine, and low-molecular weight peptides such as glutathione are also usable in the present invention.

Specific examples of inorganic sulfur compounds include cadmium sulfide, zinc sulfide, iron sulfide, iron disulfide, molybdenum disulfide, iron pyrite, molybdenite, chalcopyrite, lead glance, cinnabar, sodium disulfide, carbon disulfide, calcium pentasulfide, calcium sulfide, sulfur dioxide, sulfur trioxide, sulfur hexafluoride, sulfur dichloride, carbon disulfide, hydrogen sulfide, barium sulfate, and sodium thiosulfate. Further examples thereof include sulfurous acid that is oxo acid of sulfur, sulfuric acid, peroxomonosulfuric acid, thiosulfuric acid, dithionous acid, disulfurous acid, dithionic acid, disulfuric acid, peroxodisulfuric acid, and polythionic acid.

In one embodiment of the present invention, the use of sulfur compounds having a function as surfactants is preferred. Since the sulfur compound has a function as a surfactant, sulfur element is homogeneously dispersed in materials for an air electrode. As a result, it is considered that an air electrode can be preferably prepared and the separation can be effectively prevented.

In the present invention, the air electrode may have either a single-layer or multilayer structure. An example of a construction of the air electrode having a multilayer structure is that $La_{0.6}Sr_{0.4}Co_{0.2}Fe_{0.8}O_3$ is provided as an air electrode catalyst layer on a solid electrolyte and $La_{0.6}Sr_{0.4}Co_{0.8}Fe_{0.2}O_3$ is provided as an air electrode and the outermost layer of the fuel cell.

Fuel Electrode

In the present invention, the fuel electrode is not particularly limited as long as the fuel electrode, which is associated with the air electrode, constitutes a fuel cell. Examples thereof include NiO/zirconium-containing oxides and NiO/cerium-containing oxides. The NiO/zirconium-containing oxide means a homogeneous mixture composed of NiO and a zirconium-containing oxide at a predetermined ratio. The NiO/cerium-containing oxide means a homogeneous mixture composed of NiO and a cerium-containing oxide at a predetermined ratio. Examples of zirconium-containing oxides in NiO/zirconium-containing oxides include zirconium-containing oxides doped with at least one of CaO, $Y_2O_3$, and $Sc_2O_3$. Examples of cerium-containing oxides in NiO/cerium-containing oxides include compounds represented by general formula $Ce1-yLnyO_2$ wherein Ln represents any one or a combination of at least two of La, Pr, Nd, Sm, Eu, Gd, Tb, Dy, Ho, Er, Tm, Yb, Lu, Sc, and Y; and $0.05 \leq y \leq 0.50$. NiO is reduced under a fuel atmosphere into Ni. Accordingly, the above mixture is converted to a Ni/zirconium-containing oxide or a Ni/cerium-containing oxide.

In the present invention, the fuel electrode may have either a single-layer or a multilayer structure. Examples of the fuel electrode having a multilayer structure include a fuel electrode made of a Ni/YSZ (yttria-stabilized zirconia) at the support side, a fuel electrode made a Ni/GDC ($Gd_2O_3$—$CeO_2$) (a layer functioning as a fuel electrode catalyst layer) at the solid electrolyte side, and a fuel electrode including both the layers.

Solid Electrolyte

In the present invention, the solid electrolyte is not particularly limited as long as the solid electrolyte, which is associated with the air electrode, constitutes a fuel cell. Examples thereof include lanthanum gallate-based oxides and stabilized zirconia doped with at least one of Y, Ca, and Sc as a dopant. The solid electrolyte is preferably a lanthanum gallate-based oxide-doped with Sr and Mg, more preferably a lanthanum gallate-based oxide (LSGM) represented by general formula $La_{1-a}Sr_aGa_{1-b-c}Mg_bCo_cO_3$ wherein $0.05 \leq a \leq 0.3$, $0<b<0.3$, and $0 \leq c \leq 0.15$. In one preferred embodiment of the present invention, a cerium-based oxide ($Ce_{1-x}La_xO_2$ wherein $0.3<x<0.5$) that is a ceria doped with La may be provided as a reaction prevention layer between the solid electrolyte and the fuel electrode. The reaction prevention layer is preferably $Ce_{0.6}La_{0.4}O_2$.

In the present invention, the solid electrolyte may have either a single-layer structure or a multilayer structure. An example of a construction of the solid electrolyte having the multilayer structure is that a reaction prevention layer made of $Ce_{0.6}La_{0.4}O_2$ or the like is provided between the fuel electrode and the solid electrolyte made of LSGM.

Fuel Cell

FIG. 1 is a typical view showing one embodiment of a cross section of a solid oxide fuel cell according to the present invention, the solid oxide fuel cell is of such a type that the inner electrode is a fuel electrode. For example, the solid oxide fuel cell 210 in the present invention includes a porous support 201, a (first/second) fuel electrode 202, a (first/second) solid electrolyte 203, a (first/second) air electrode 204, and a current collecting layer 205. Here "(first/second)" means that the electrode or the electrolyte has a single-layer or two- or more-layer structure and, in the two-layer structure, includes first and second layers. In the solid oxide fuel cell according to the present invention, the cell preferably includes the porous support with a thickness of the layer is preferably 0.5 to 2 mm, the fuel electrode with a thickness of 10 to 200 µm, the fuel electrode catalyst layer with a thickness of 0 to 30 µm, the reaction prevention layer with a thickness of 0 to 20 µm, the solid electrolyte with a thickness of 5 to 60 µm, the air electrode catalyst layer with a thickness of 0 to 50 µm, and the air electrode with a thickness of 10 to 200 µm.

Figure 2:
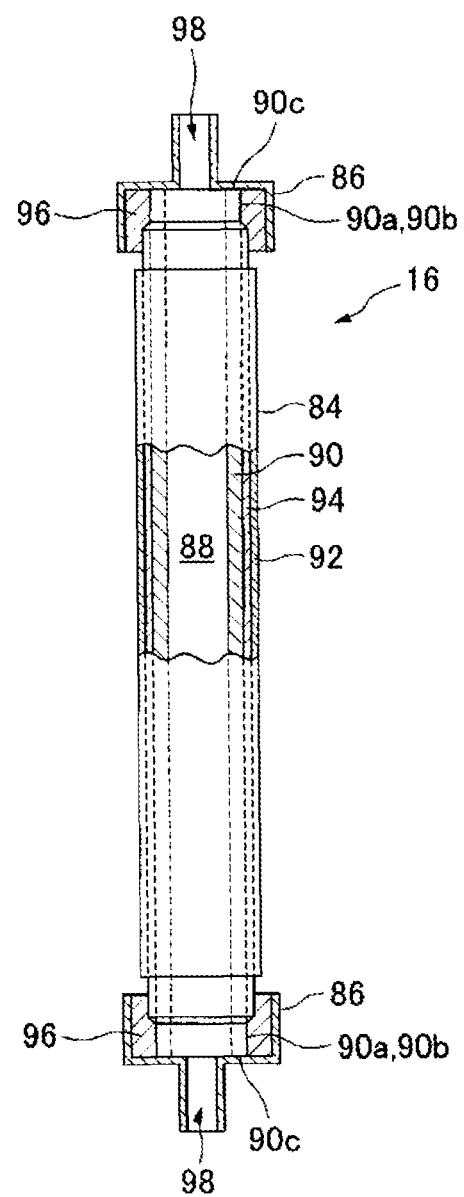
FIG. 2 is a partial cross-sectional view showing a fuel cell unit according to the present invention.

FIG. 2 is a partial cross-sectional view of a fuel cell unit according to the present invention. As shown in the drawing, a fuel cell unit 16 includes a fuel cell 84 and an inner electrode terminal 86 connected to top and bottom ends of the fuel cell 84. The fuel cell 84 is a tubular structure that extends vertically. In the inside of the tubular structure, an inner electrode layer 90, an outer electrode layer 92, and a solid electrolyte 94 between the inner electrode layer 90 and the outer electrode layer 92 are provided on a cylindrical porous support 91 that defines a fuel gas flow path 88.

The inner electrode terminals 86 that are respectively attached to the top end and the bottom end of the fuel cell 84 have an identical structure. Accordingly, the inner electrode terminal 86 attached to the top end will be described in more detail. The inner electrode layer 90 in its top 90a includes an outer perimeter surface 90b and a top surface 90c that are exposed to the solid electrolyte 94 and the outer electrode layer 92. The inner electrode terminal 86 is connected to the outer perimeter surface 90b of the inner electrode layer 90 through a conductive seal material 96 and is in direct contact with the top surface 90c of the inner electrode layer 90, whereby the inner electrode terminal 86 is connected electrically to the inner electrode layer 90. A fuel gas flow path 98 that communicates with a fuel gas flow path 88 of the inner electrode layer 90 is provided at the central portion of the inner electrode terminal 86.

Method for Manufacturing Cell

The solid oxide fuel cell according to the present invention can be properly manufactured according to a publicly known method, except that sulfur element is contained in the air electrode. A preferred manufacturing method is as follows.

In the present invention, the air electrode can be obtained by adding a solvent (such as water or alcohol), a dispersant, and a molding assistant such as a binder to a starting material powder to prepare a slurry, applying the slurry to a solid electrolyte or its precursor, drying the coated solid electrolyte or the coated precursor, and firing the dried solid electrolyte or the dried precursor at preferably at 1000° C. or more to less than 1200° C. In the present invention, "coating on a solid electrolyte or its precursor" includes the feature that the slurry is coated directly on the solid electrolyte and also includes the feature that the slurry is coated on the solid electrolyte through an intermediate layer such as a catalyst layer. Furthermore, "precursor" means a material before firing or a compact before firing either of which becomes a solid electrolyte after firing according to an embodiment where the solid electrolyte and the air electrode are co-firing simultaneously fired.

In a first embodiment of the manufacturing method according to the present invention, a starting material powder is prepared by mixing a perovskite oxide with a sulfur compound. This starting material powder is used to prepare a slurry. In another embodiment of the present invention, a sulfur compound is mixed with starting materials for the preparation of a perovskite oxide to obtain a mixture. This mixture is fired, preferably at 1100° C. or more to less than 1250° C., to obtain a sulfur element-containing perovskite oxide. The sulfur element-containing perovskite oxide is comminuted to prepare a starting material powder. The starting material powder is used to prepare a slurry. The starting material employed in preparing the perovskite oxide means a mixture of starting materials employed in preparing a desired perovskite oxide. In any embodiment, the above organic sulfur compounds or inorganic sulfur compounds may be used as the sulfur compound.

The coating can be more preferably carried out by a slurry coating method that a slurry liquid is applied, a tape casting method, a doctor blading method, and a transfer method. Printing methods are also usable, and examples thereof include screen printing and ink jet methods.

The solid electrolyte and the fuel electrode can be obtained by adding a solvent (such as water or alcohol), a dispersant, and a molding assistant such as a binder to a starting material powder to prepare a slurry, coating the slurry, drying the coating, and firing the dried coating, preferably at not less than 1100° C. and less than 1400° C. The coating can be more preferably carried out by a slurry coating method that a slurry liquid is coated, a tape casting method, a doctor blading method, and a transfer method. Printing methods are also usable, and examples thereof include screen printing and ink jet methods.

The firing may be carried out each time when each of the electrodes and the solid electrolyte layers are formed. Alternatively, "co-firing" in which a plurality of layers are simultaneously fired is also possible. The firing is preferably carried out under an oxidizing atmosphere so as to avoid the denaturation of the solid electrolyte by diffusion of the dopant or the like. More preferably, the firing is carried out in an atmosphere having an oxygen concentration of 20% by mass to 30% by mass using a mixed gas composed of air and oxygen.

In a preferred embodiment of the present invention, when a fuel electrode and an air electrode are used as the inner electrode and the outer electrode, respectively, a method is adopted that includes co-firing the fuel electrode and the solid electrolyte, molding the air electrode, and firing the air electrode at a temperature below the co-firing.

Solid Oxide Fuel Cell and Fuel Cell System Using the Solid Oxide Fuel Cell

Figure 3:
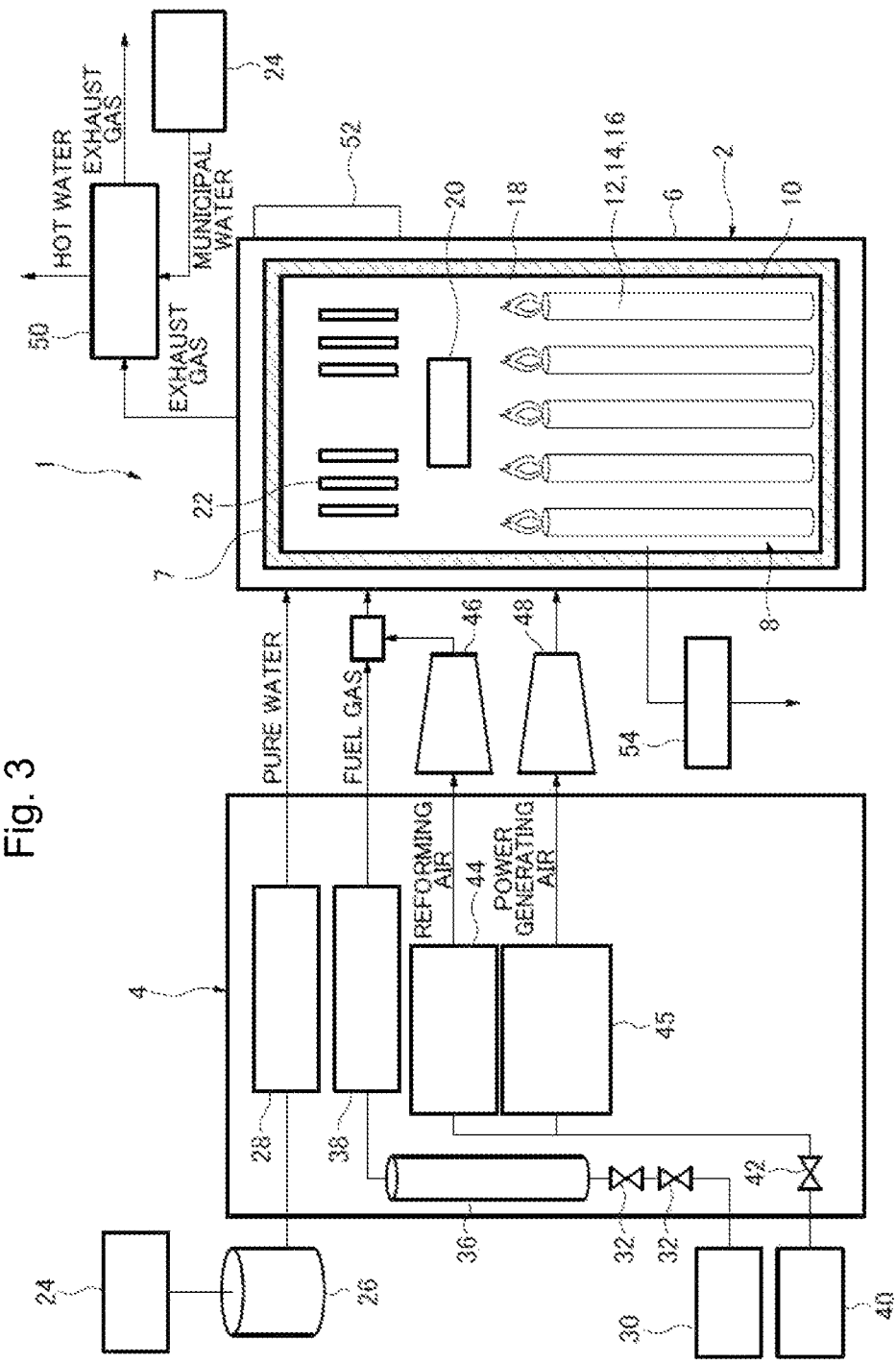
FIG. 3 is a configuration diagram showing one embodiment of a solid oxide fuel cell system including a solid oxide fuel cell according to the present invention.

According to the present invention, there is provided a solid oxide fuel cell system including a solid oxide fuel cell. FIG. 3 is a view showing an overall configuration of a solid oxide fuel cell system in one embodiment of the present invention. As shown in FIG. 3, a solid oxide fuel cell system 1 includes a fuel cell module 2 and an auxiliary unit 4.

The fuel cell module 2 includes a housing 6, and a sealed space 8 is provided within the housing 6 through an insulating material 7. It should be noted that the insulating material is not indispensable and thus may be omitted. A fuel cell assembly 12 that functions to conduct a power generation reaction of a fuel gas with an oxidant (air) is disposed in a power generating chamber 10 located in a lower portion of the sealed space 8. The fuel cell assembly 12 includes ten fuel cell stacks 14 (see FIG. 5), and each of the fuel cell stacks 14 includes 16 fuel cell units 16 (see FIG. 2). Thus, the fuel cell assembly 12 includes 160 fuel cell units 16, and all the fuel cell units 16 are serially connected.

A combustion chamber 18 is provided above the power generating chamber 10 in the sealed space 8 in the fuel cell module 2. The combustion chamber 18 is configured so that the residual fuel gas and the residual oxidant (air) that remain unused in the power generation reaction are combusted to produce an exhaust gas. A reformer 20 that reforms a fuel gas is disposed above the combustion chamber 18, and the combustion chamber 18 is heated by heat of combustion of the remaining gas to a temperature high enough to induce a reforming reaction. Further, an air heat exchanger 22 that receives the heat of the reformer 20 to heat air and thus to suppress a lowering in temperature of the reformer 20 is provided above the reformer 20.

The auxiliary unit 4 includes a pure water tank 26 that stores water from a water supply source 24, such as municipal water, and filters the water to produce pure water, and a water flow rate regulation unit 28 that regulates the flow rate of water supplied from the reservoir tank. The auxiliary unit 4 further includes a gas shutoff valve 32 that shuts off the fuel gas, such as a municipal gas, supplied from a fuel supply source 30, a desulfurizer 36 that desulfurizes the fuel gas, and a fuel gas flow rate regulation unit 38 that regulates the flow rate of the fuel gas. Furthermore, the auxiliary unit 4 includes an electromagnetic valve 42 that shuts off air as an oxidant supplied from an air supply source 40, a reforming air flow rate regulation unit 44 and a power generating air flow rate regulation unit 45 that regulate the flow rates of air, a first heater 46 that heats reforming air supplied to the reformer 20, and a second heater 48 that heats a power generating air supplied to the power generating chamber. The first and second heaters 46 and 48 are provided to efficiently raise temperature at startup, but may be omitted.

A hot-water producing device 50 into which the exhaust gas is supplied is connected to the fuel cell module 2. The hot-water producing device 50 is supplied with a municipal water from the water supply source 24. This municipal water is heated by heat of the exhaust gas to produce hot water that is supplied to a hot water reservoir tank in an external water heater (not shown). Moreover, a control box 52 that controls the supply flow rate of the fuel gas and the like is mounted on the fuel cell module 2. An inverter 54 as an electrical power extraction unit (electrical power conversion unit) for supplying electrical power generated by the fuel cell module to the outside is connected to the fuel cell module 2.

Figure 4:
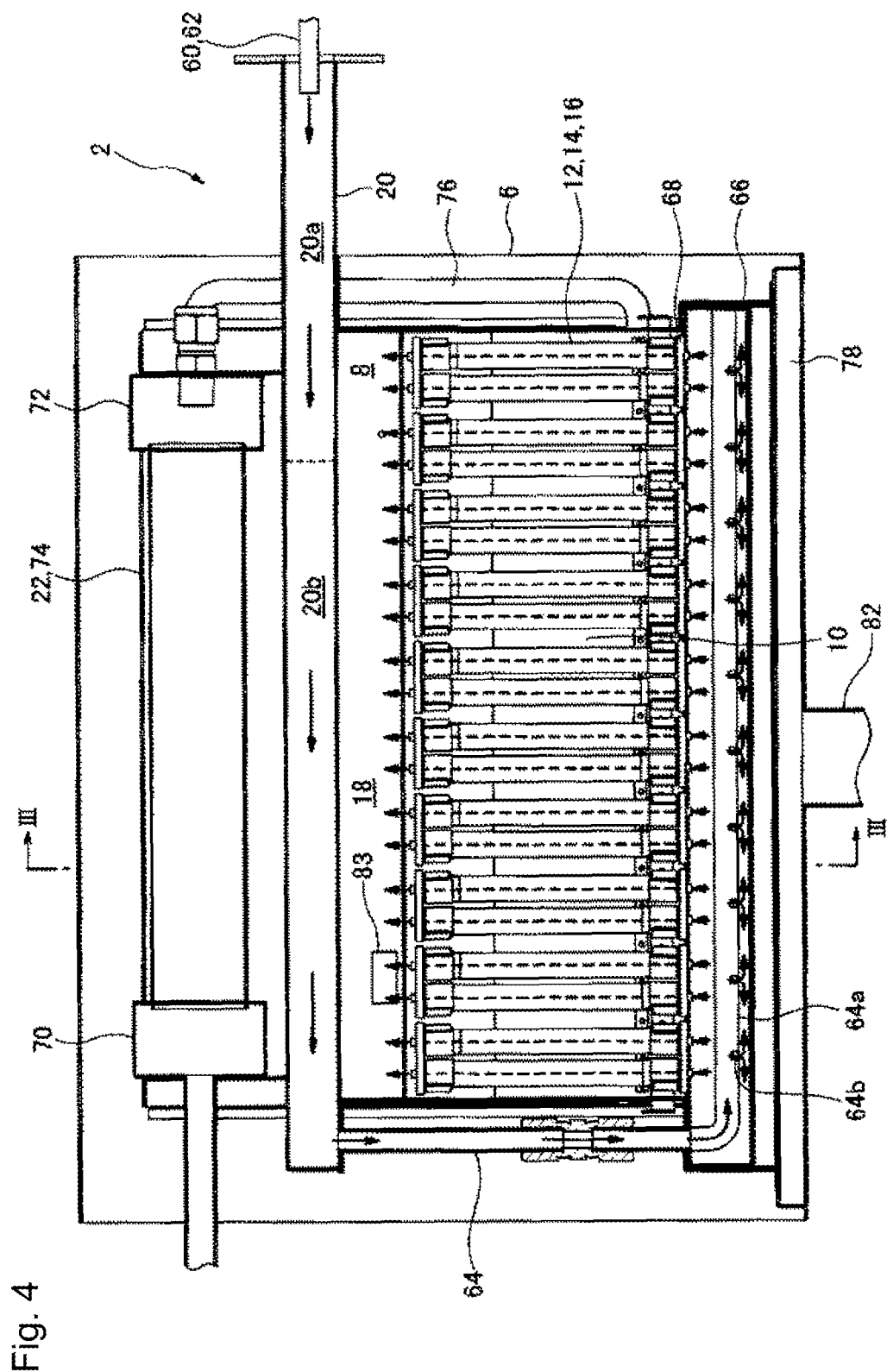
FIG. 4 is a side sectional view showing a fuel cell module in a solid oxide fuel cell system.
Figure 6:
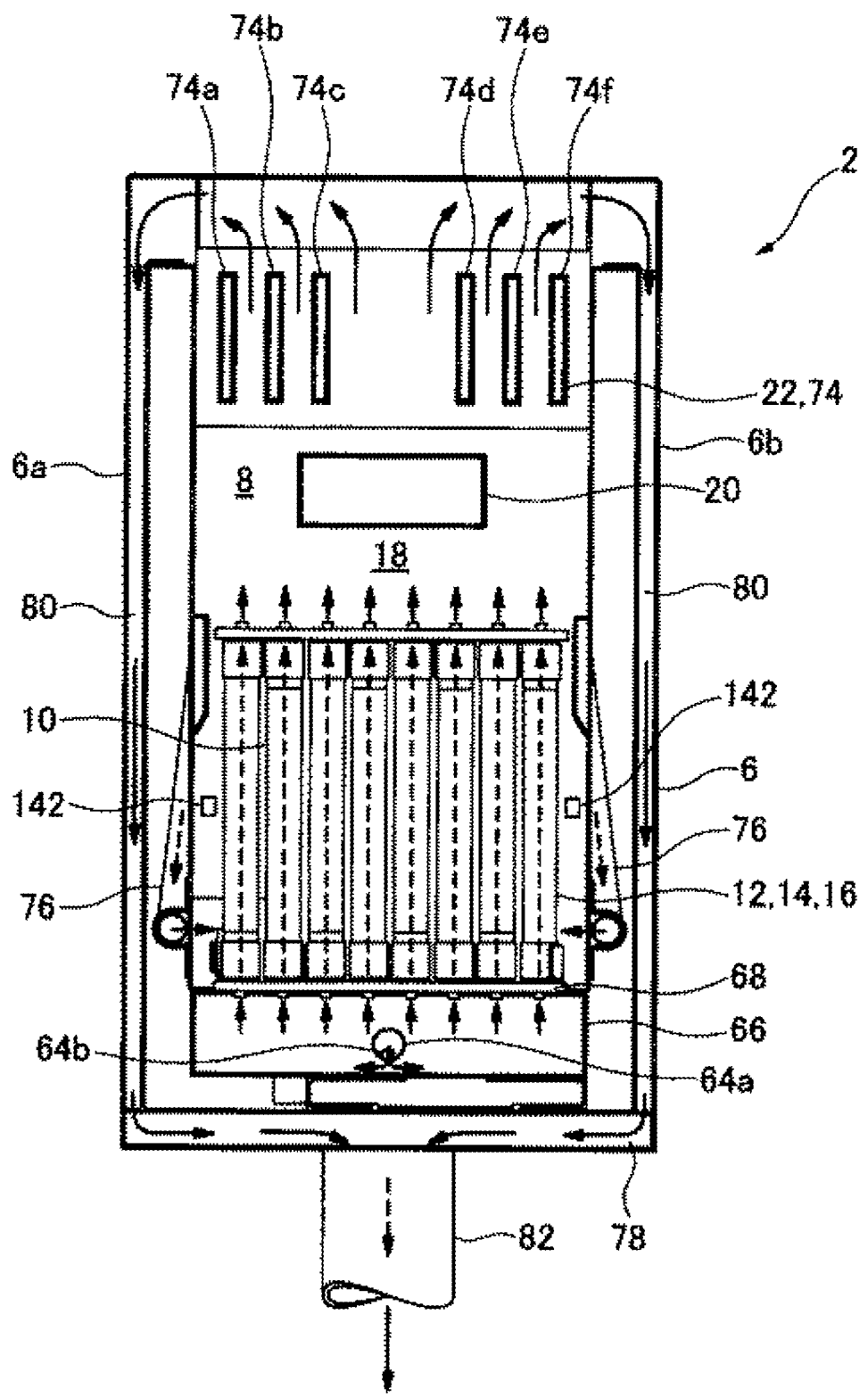
FIG. 6 is a cross-sectional view taken along line III-III of FIG. 4.

The internal structure of the fuel cell module in the solid oxide fuel cell system will be described with reference to FIGS. 4 and 6. FIG. 4 is a side cross-sectional view showing the fuel cell module of the solid oxide fuel cell system, and FIG. 6 is a cross-sectional view taken along line III-III of FIG. 4. As shown in FIGS. 4 and 6, the fuel cell assembly 12, the reformer 20, and the air heat exchanger 22 are arranged in sequence from the bottom in the sealed space 8 within the housing 6 in the fuel cell module 2.

A pure water guide pipe 60 that introduces pure water and a reformed gas guide pipe 62 that introduces the reforming target fuel gas, and a reforming air are attached to an upstream end of the reformer 20. A vaporizing section 20a and a reforming section 20b are provided within the reformer 20 in sequence from the upstream side. The reforming section 20b is filled with a reforming catalyst. The fuel gas and air that are introduced into the reformer 20 and mixed with steam are reformed by the reforming catalyst filled into the reformer 20.

A fuel gas supply line 64 is connected to a downstream end of the reformer 20. The fuel gas supply line 64 extends downward and further extends horizontally within a manifold 66 provided below the fuel cell assembly 12. A plurality of fuel supply holes 64b are formed in a bottom surface of a horizontal portion 64a of the fuel gas supply line 64. A reformed fuel gas is supplied into the manifold 66 from the fuel supply holes 64b.

A bottom support plate 68 having through-holes for supporting the fuel cell stacks 14 is attached to the top of the manifold 66, and the fuel gas in the manifold 66 is supplied into the fuel cell unit 16.

The air heat exchanger 22 is provided above the reformer 20. The air heat exchanger 22 includes an air concentration chamber 70 on the upstream side of the air heat exchanger 22 and two air distribution chambers 72 on the downstream side of the air heat exchanger 22. The air concentration chamber 70 and the air distribution chambers 72 are connected by six air flow conduits 74. Here, as shown in FIG. 6, air in the air concentration chamber 70 flows from the two sets of the air flow conduits 74, each set having three air flow conduits 74 (74a, 74b, 74c, 74d, 74e, 74f), into the respective air distribution chambers 72.

Air that flows in the six air flow conduits 74 of the air heat exchanger 22 is pre-heated by an exhaust gas that is produced as a result of combustion in the combustion chamber 18 and rises. An air guide pipe 76 is connected to each of the air distribution chambers 72. The air guide pipe 76 extends downward. A lower end of the air guide pipe 76 communicates with a lower space in the power generating chamber 10 to introduce pre-heated air into the power generating chamber 10.

An exhaust gas chamber 78 is provided below the manifold 66. As shown in FIG. 6, exhaust gas conduits 80 that extend in a vertical direction are provided on the inner side of a front surface 6a and a rear surface 6b which form the faces in a longitudinal direction of the housing 6. Top ends of the exhaust gas conduits 80 communicate with a space in which the air heat exchanger 22 is disposed, and bottom ends thereof communicate with the exhaust gas chamber 78. An exhaust gas discharge pipe 82 is connected to a nearly central portion of a bottom surface of the exhaust gas chamber 78. A downstream end of the exhaust gas discharge pipe 82 is connected to the hot-water producing device 50 shown in FIG. 3. As shown in FIG. 4, an ignition device 83 that starts the combustion of the fuel gas and air is provided in the combustion chamber 18.

Figure 5:
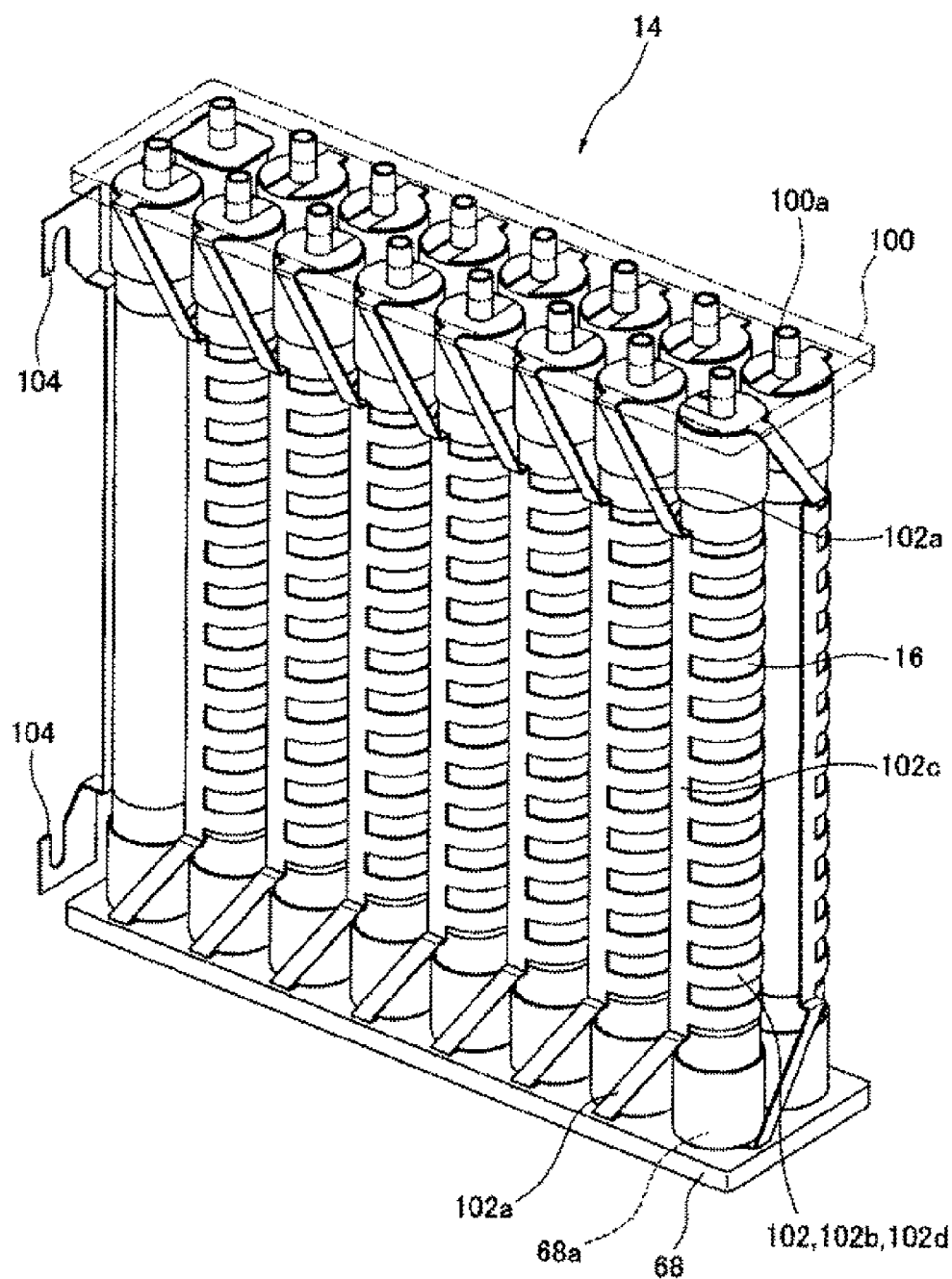
FIG. 5 is a perspective view showing a fuel cell stack in a solid oxide fuel cell system.

A fuel cell stack 14 will be described with reference to FIG. 5. FIG. 5 is a perspective view showing a fuel cell stack in a solid oxide fuel cell system. As shown in FIG. 5, the fuel cell stack 14 includes 16 fuel cell units 16, and the bottom end and the top end of these fuel cell units 16 are supported by ceramic bottom support plate 68 and top support plate 100, respectively. Through-holes 68a and 100a through which an inner electrode terminal 86 is passed are provided in the bottom support plate 68 and the top support plate 100, respectively.

A current collector 102 and an external terminal 104 are attached to the fuel cell unit 16. The current collector 102 is provided integrally with a fuel electrode connection portion 102a electrically connected to the inner electrode terminal 86 attached to an inner electrode layer 90 that is a fuel electrode, and an air electrode connection portion 102b electrically connected to the whole outer perimeter surface of an outer electrode layer 92 that is an air electrode. A vertical portion 102c that extends vertically on the surface of the outer electrode layer 92, and a number of horizontal portions 102d that extend horizontally along the surface of the outer electrode layer 92 from the vertical portion 102c constitute the air electrode connection portion 102b. The fuel electrode connection portion 102a linearly extends obliquely upward or obliquely downward from the vertical portion 102c of the air electrode connection portion 102b towards the inner electrode terminal 86 located in a vertical direction of the fuel cell unit 16.

An external terminal 104 is connected to the inner electrode terminals 86 provided at top ends and bottom ends of two fuel cell units 16 located at the end of the fuel cell stack 14 (back side and front side of left end in FIG. 5). These external terminals 104 are connected to an external terminal 104 (not shown) of the fuel cell unit 16 located at the end of the adjacent fuel cell stack 14, and, as described above, all of the 160 fuel cell units 16 are serially connected.

Next, a start-up mode of the fuel cell system (shown) will be described. At the outset, air is supplied to a reformer 20 while a reforming air flow rate regulation unit 44, an electromagnetic valve 42, and a mixing portion 47 is controlled so as to increase the amount of the reforming air. Air for power generation is supplied through an air guide pipe 76 to the power generating chamber 10 while a power generation air flow rate regulation unit 45 and the electromagnetic valve 42. A reforming target gas is supplied to the reformer 20 while controlling the fuel flow rate regulatior unit 38 and the mixing portion 47 is controlled so as to increase the amount of the fuel gas. The reforming target gas and the reforming air fed into the reformer 20 are fed into each of the fuel cell units 16 from the respective through-holes 69 through the reformer 20, the fuel gas supply line 64, and the gas manifold 66. The reforming target gas and the reforming air fed into each of the fuel cell units 16 are passed through a fuel gas flow path 88 from a fuel gas flow path 98 provided at a lower end of each of the fuel cell unit 16 and flows out from a fuel gas flow path 98 provided at the top end of the fuel cell unit 16. Thereafter, the reforming target gas that has flowed from the top end of the fuel gas flow path 98 is ignited with an igniter 83 to execute combustion operation. Thus, the reforming target gas is burned within the combustion chamber 18 to cause a partial oxidation reforming reaction.

Thereafter, when the temperature of the reformer 20 rises to about 600° C. or above and the temperature of the fuel cell assembly 12 exceeds about 250° C., the partial oxidation reforming reaction is shifted to an auto thermal reforming reaction. At that time, a premixed gas composed of the reforming target gas, reforming air, and steam which is regulated by the water flow rate regulation unit 28, the fuel flow rate regulation unit 38, and the reforming air flow rate regulation unit 44 is supplied to the reformer 20. Subsequently, when the temperature of the reformer 20 rises to 650° C. or above and the temperature of the fuel cell assembly 12 exceeds about 600° C., the reforming reaction is shifted to a steam reforming reaction.

As described above, when a reforming process is switched from the ignition according to the progress of a combustion process, the temperature in the power generating chamber 10 gradually rises. When the temperature in the power generating chamber 10 reaches a predetermined power generation temperature, which is below a rated temperature for stable actuation of the fuel cell module 2 (about 700° C.), an electric circuit including the fuel cell module 2 is closed. Consequently, power generation is started in the fuel cell module 2, and electric current flows in the circuit to allow electric power to be supplied to the outside.

Next, the stop of operation of the solid oxide fuel cell in this embodiment will be described. Regarding the stop of the operation of the fuel cell system, while continuing the supply of the fuel even after stopping the takeout of electric power from the fuel cell module, a large amount of air for cooling is fed to cool the fuel cell stack. When the temperature of the fuel cell stack is below an oxidation temperature of the fuel electrode in the fuel cell, the supply of the fuel is stopped. Thereafter, until the temperature is satisfactorily lowered, the supply of only cooling air is continued to completely stop the fuel cell.

In emergency situations, the fuel cell system can be stopped by shutdown in such a manner that the electric power and the supply of the fuel gas, the air, and the water for fuel reforming are substantially simultaneously shut off. Alternatively, a method may also be adopted in which the fuel system is stopped while gradually reducing the amount of the fuel fed after the stop of the takeout of the electric power or a method in which the fuel system is stopped without the flow of a purge gas such as $N_2$ gas.

Substantially simultaneous shut off in the above means that all of the electric current, the air, the gas, and the water in a very short time of several tens of seconds or less. More specifically, the stopping operation is carried out in such a manner that, ten-odd seconds after the stop of current supply, the supply of the air and the fuel gas is stopped and, ten-odd seconds after the stop of the supply of the air and the fuel gas, the supply of water is stopped.

EXAMPLES

The present invention is further illustrated by Examples that are not intended as a limitation of the invention.

Example 1

Preparation of Slurry for Air Electrode

A slurry for an air electrode was prepared by mixing a starting material powder having a composition of $La_{0.6}Sr_{0.4}Co_{0.2}Fe_{0.8}O_3$, a solvent, a binder, and sodium dioctyl sulfosuccinate as a sulfur compound and comminuting the mixture. In the addition of the sulfur compound, the content of the sulfur compound was regulated so that the content of sulfur in the air electrode as fresh after firing was 50 ppm.

Preparation of Solid Oxide Fuel Cell

A NiO powder and a 10YSZ (10 mol % $Y_2O_3$-90 mol % $ZrO_2$) powder were mixed together at a weight ratio of 65:35 to obtain a mixture. A fuel electrode support was prepared by extruding the mixture through an extruder into a cylindrical shape while applying shear to the mixture to crush the mixture into primary particles, calcining the molded product at 900° C. A fuel electrode catalyst layer that accelerates the reaction of the fuel electrode was formed on the fuel electrode support. The fuel electrode catalyst layer was formed by coating a mixture composed of NiO and GDC10 (10 mol % $Gd_2O_3$-90 mol % $CeO_2$) at a weight ratio of 50:50 on the fuel electrode support by slurry coating. Further, LDC40 (40 mol % $La_2O_3$-60 mol % $CeO_2$) and LSGM having a composition of $La_{0.8}Sr_{0.2}Ga_{0.8}Mg_{0.2}O_3$ were laminated in that order by the slurry coating method on the fuel electrode reaction catalyst layer to form a solid electrolyte layer. Thus, a compact was obtained. The compact was fired at 1300° C. Thereafter, a slurry for an air electrode was coated by the slurry coating method, and the coating was fired at 1050° C. to prepare a solid oxide fuel cell.

The air electrode after firing of the fuel cell was shaved and the content of sulfur remaining in the shaved air electrode was measured by a carbon/sulfur analyzer. When the content of sulfur is measured from the completed fuel cell after forming of a current collecting layer on the air electrode, a method may be adopted in which the air electrode is shaved off and the sulfur content is measured.

The solid oxide fuel cell thus prepared was as follows. The fuel electrode support had an outer diameter of 10 mm and a thickness of 1 mm. The fuel electrode reaction catalyst layer had a thickness of 20 μm. The LDC layer had a thickness of 5 μm. The LSGM layer had a thickness of 30 μm. The air electrode had a thickness of 25 μm, and the area of the air electrode was 35 $cm^2$.

An air electrode current collecting layer was formed by applying a coating liquid to the air electrode. The coating liquid was prepared by mixing a silver powder, a palladium powder, an LSCF powder, a solvent, and a binder together. The air electrode current collecting layer was formed on the outer surface of the air electrode by spraying the coating liquid on the air electrode of the solid oxide fuel cell, drying the coated by a drier, cooling the dried solid oxide fuel cell at room temperature, and firing the cooled coating at 700° C. for one hr. The air electrode current collecting layer includes silver, palladium, and LSCF.

Fabrication of Solid Oxide Fuel Cell Module

A fuel cell unit was prepared by attaching a conductive seal material that served both as a current collector and a gas seal, to both ends of the fuel electrode support and providing an inner electrode terminal at both ends of the fuel electrode so as to cover the conductive seal material. The diameter of the inner electrode terminal was smaller than the inner diameter of the fuel electrode support that served as a fuel gas path, and the inner electrode terminal had a reduced diameter portion that extended outward from each end of the cell. Sixteen fuel cell units of the above type made a set, and the 16 fuel cell units were serially connected by a connecter that connected the fuel electrode and the air electrode to prepare a stack. Ten sets of stacks were mounted, and the 160 fuel cell units were serially connected. Further, a reformer, an air pipe, and a fuel pipe were attached, and the assembly was surrounded by a housing to prepare a solid oxide fuel cell module. This fuel cell module was incorporated in a solid oxide fuel cell system.

Power Generation Test of Solid Oxide Fuel Cell

A power generation test was performed using solid oxide fuel cells (effective area of electrode: 35.0 $cm^2$) obtained in the following Examples. For current collection of the fuel electrode, a silver wire was wound around the inner fuel electrode terminal. For current collection of the air electrode, a silver wire was here again wound around the outer perimeter of the air electrode current collecting layer. Power generation was carried out under the following conditions. Specifically, a mixed gas composed of a fuel ($H_2$+3% $H_2O$) and $N_2$ was used as a fuel gas. The utilization rate of fuel was 75%. Air was used as an oxidant gas. The power generation potential was measured at 700° C. and a current density of 0.2 A/$cm^2$. The initial performance of the cell was expressed as an initial potential in the Table 1.

Shutdown Test

The fuel cell system was operated as follows, followed by shutdown. The appearance of the solid oxide fuel cell within the module was visually inspected.

Power Generation in Fuel Cell System

City gas 13A was used as the fuel gas, and the utilization rate of fuel was 75%. Air was used as the oxidant, the air utilization rate was 40%. S/C was 2.25. The fuel cell system was operated under conditions of a power generation steady temperature of 700° C. and a current density of 0.2 A/$cm^2$.

Stop of Fuel Cell System

The fuel cell system was stopped by shutdown in which, after the fuel cell system was operated at the steady temperature for 2 hr the supplies of the current, the fuel gas, the air, and the water in the fuel cell system were substantially simultaneously shut off. Thereafter, the module within the system was taken out, and the appearance of the solid oxide fuel cell within the module was visually inspected. The appearance was evaluated according to the following criteria.

Evaluation Criteria

Excellent: Even after shutdown is repeated 100 times or more, the fuel cell system has no trouble with power generation. Neither separation of the air electrode nor breaking of the cell occurs.

Good: Even after shutdown is repeated less than 100 times, the fuel cell system has no trouble with power generation was satisfactory without troubles. Neither separation of the air electrode nor breaking of the cell occurs. However, when shutdown is repeated 100 times or more, lifting (crinkling) of the air electrode is observed although the separation of the air electrode does not occur.

Fair: Even after shutdown is repeated less than 5 times, the fuel cell system has no trouble with power generation was satisfactory without troubles. Neither separation of the air electrode nor breaking of the cell occurred. However, when shutdown is repeated 5 times or more, lifting (crinkling) of the air electrode is observed although the separation of the air electrode does not occur.

Poor: The separation of the air electrode is observed in shutdown is repeated less than 5 times.

The results were as shown in Table 1 which will be described later.

Example 2

A solid oxide fuel cell and a fuel cell system were prepared in the same manner as in Example 1, except that the addition content of the sulfur compound was regulated so that the content of sulfur in the air electrode after firing was 100 ppm. The test as described in Example 1 was then carried out. The results were as shown in Table 1 which will be described later.

Example 3

A solid oxide fuel cell and a fuel cell system were prepared in the same manner as in Example 1, except that the addition content of the sulfur compound was regulated so that the content of sulfur in the air electrode after firing was 200 ppm. The test as described in Example 1 was then carried out. The results were as shown in Table 1 which will be described later.

Example 4

A solid oxide fuel cell and a fuel cell system were prepared in the same manner as in Example 1, except that the addition content of the sulfur compound was regulated so that the content of sulfur in the air electrode after firing was 500 ppm. The test as described in Example 1 was then carried out. The results were as shown in Table 1 which will be described later.

Example 5

A solid oxide fuel cell and a fuel cell system were prepared in the same manner as in Example 1, except that the addition content of the sulfur compound was regulated so that the content of sulfur in the air electrode after firing was 1,000 ppm. The test as described in Example 1 was then carried out. The results were as shown in Table 1 which will be described later.

Example 6

A solid oxide fuel cell and a fuel cell system were prepared in the same manner as in Example 1, except that the addition content of the sulfur compound was regulated so that the content of sulfur in the air electrode after firing was 3,000 ppm. The test as described in Example 1 was then carried out. The results were as shown in Table 1 which will be described later.

Comparative Example 1

A slurry for an air electrode was prepared by mixing a starting material powder having a composition of $La_{0.6}Sr_{0.4}Co_{0.2}Fe_{0.8}O_3$, a solvent, and a binder and comminuting the mixture. A solid oxide fuel cell and a fuel cell system were prepared in the same manner as in Example 1, except that the slurry thus obtained was used. The content of sulfur in the air electrode in the cell was 10 ppm. The test as described in Example 1 was then carried out. The results were as shown in Table 1 which will be described later.

Comparative Example 2

A solid oxide fuel cell and a fuel cell system were prepared in the same manner as in Example 1, except that the addition content of the sulfur compound was regulated so that the content of sulfur in the air electrode after firing was 5,000 ppm. The test as described in Example 1 was then carried out. The results were as shown in Table 1 which will be described later.

TABLE 1

| | Sulfur addition method | Content of sulfur in air electrode [ppm] | Shutdown test Separation of air electrode | Initial performance [V]@ Rated output: 7 A |
|---|---|---|---|---|
| Example 1 | Addition of slurry | 50 | Fair | 0.856 |
| Example 2 | Addition of slurry | 100 | Good | 0.855 |
| Example 3 | Addition of slurry | 200 | Excellent | 0.854 |
| Example 4 | Addition of slurry | 500 | Excellent | 0.848 |
| Example 5 | Addition of slurry | 1000 | Excellent | 0.842 |
| Example 6 | Addition of slurry | 3000 | Excellent | 0.831 |
| Comparative Example 1 | Not done | 10 | Bad | 0.857 |
| Comparative Example 2 | Addition of slurry | 5000 | Excellent | 0.798 |

Example 8

Lanthanum oxide ($La_2O_3$), strontium carbonate ($SrCO_3$), cobalt carbonate ($CoCO_3$), and iron oxide ($Fe_2O_3$) powders and sodium dioctyl sulfosuccinate as a sulfur compound were weighed as starting compounds so as to provide a composition of $La_{0.6}Sr_{0.4}Co_{0.2}Fe_{0.8}O_3$ and were mixed together in a solution. Thereafter, the solvent was removed, and the powder obtained by removing the solvent was fired at 1200° C. and comminuted to prepare a sulfur-containing starting material powder for an air electrode. The content of the organic sulfur compound contained in the starting material powder for an air electrode was regulated so that the content of sulfur in the air electrode after firing in the fuel cell was 50 ppm. A slurry for an air electrode was prepared by mixing the starting material powder, a solvent, and a binder and comminuting the mixture. A solid oxide fuel cell and a fuel cell system were prepared in the same manner as in Example 1, except that the slurry for an air electrode was used. The test as described in Example 1 was then carried out. The results were as shown in Table 2 which will be described later.

Example 9

A solid oxide fuel cell and a fuel cell system were prepared in the same manner as in Example 8, except that the addition content of the sulfur compound was regulated so that the content of sulfur in the air electrode after firing was 100 ppm. The test as described in Example 1 was then carried out. The results were as shown in Table 2 which will be described later.

Example 10

A solid oxide fuel cell and a fuel cell system were prepared in the same manner as in Example 8, except that the addition content of the sulfur compound was regulated so that the content of sulfur in the air electrode after firing was 200 ppm. The test as described in Example 1 was then carried out. The results were as shown in Table 2 which will be described later.

Example 11

A solid oxide fuel cell and a fuel cell system were prepared in the same manner as in Example 8, except that the addition content of the sulfur compound was regulated so that the content of sulfur in the air electrode after firing was 500 ppm. The test as described in Example 1 was then carried out. The results were as shown in Table 2 which will be described later.

Example 12

A solid oxide fuel cell and a fuel cell system were prepared in the same manner as in Example 8, except that the addition content of the sulfur compound was regulated so that the content of sulfur in the air electrode after firing was 1,000 ppm. The test as described in Example 1 was then carried out. The results were as shown in Table 2 which will be described later.

Example 13

A solid oxide fuel cell and a fuel cell system were prepared in the same manner as in Example 8, except that the addition content of the sulfur compound was regulated so that the content of sulfur in the air electrode after firing was 3,000 ppm. The test as described in Example 1 was then carried out. The results were as shown in Table 2 which will be described later.

Comparative Example 3

A solid oxide fuel cell and a fuel cell system were prepared in the same manner as in Example 8, except that the addition content of the sulfur compound was regulated so that the content of sulfur in the air electrode after firing was 5,000 ppm. The test as described in Example 1 was then carried out. The results were as shown in Table 2 which will be described later.

TABLE 2

| | Sulfur addition method | Content of sulfur in air electrode [ppm] | Shutdown test Separation of air electrode | Initial performance [V]@ Rated output: 7 A |
|---|---|---|---|---|
| Example 8 | LSCF starting material powder | 50 | Fair | 0.857 |
| Example 9 | LSCF starting material powder | 100 | Good | 0.856 |
| Example 10 | LSCF starting material powder | 200 | Excellent | 0.854 |
| Example 11 | LSCF starting material powder | 500 | Excellent | 0.846 |
| Example 12 | LSCF starting material powder | 1000 | Excellent | 0.841 |
| Example 13 | LSCF starting material powder | 3000 | Excellent | 0.830 |
| Comparative Example 3 | LSCF starting material powder | 5000 | Excellent | 0.795 |

What is claimed is:

1. A solid oxide fuel cell comprising a solid electrolyte, a fuel electrode, and an air electrode, wherein
    the air electrode comprises a product obtained by firing a compact containing a perovskite oxide and sulfur element and
    the content of the sulfur element in the air electrode after the solid oxide fuel cell is prepared and fired, and before the fuel cell has started to be used for power generation is 50 ppm to 3,000 ppm.

2. The solid oxide fuel cell according to claim 1, wherein the sulfur element is derived from a sulfur compound, the sulfur compound and the perovskite oxide being independently mixed.

3. The solid oxide fuel cell according to claim 1, wherein the sulfur element is derived from a sulfur compound contained in a starting material employed in preparing the perovskite oxide.

4. The solid oxide fuel cell according to claim 1, wherein the perovskite oxide is lanthanum strontium cobaltite ferrite (LSCF).

5. The solid oxide fuel cell according to claim 1, wherein the content of the sulfur element after the solid oxide fuel cell is prepared and fire, and before the fuel cell has started to be used for power generation is 100 ppm to 3,000 ppm.

6. The solid oxide fuel cell according to claim 1, further comprising an air electrode catalyst layer.

7. A fuel cell system comprising the solid oxide fuel cell according to claim 1.

8. A method for manufacturing the solid oxide fuel cell according to claim 1, the method comprising:
    providing a starting material powder including a perovskite oxide with a sulfur compound added;
    dispersing the starting material powder in a solvent to prepare a slurry;
    applying the slurry to a solid electrolyte or its precursor, drying the coated solid electrolyte or its precursor, and firing the dried solid electrolyte or its precursor to prepare the air electrode.

9. A method for manufacturing a solid oxide fuel cell according to claim 1, the method comprising:
    firing a mixture obtained by adding a sulfur compound to a starting material employed in preparing a perovskite oxide to obtain a sulfur element-containing perovskite oxide;
    comminuting the perovskite oxide to obtain a starting material powder;
    dispersing the starting material powder in a solvent to prepare a slurry; and
    applying the slurry to a solid electrolyte or its precursor, drying the coated solid electrolyte or its precursor, and firing the dried solid electrolyte or its precursor to prepare the air electrode.

* * * * *